May 5, 1936.  C. H. RICHARDS  2,039,451
POWER TRANSMISSION MECHANISM
Filed March 11, 1933   6 Sheets-Sheet 2

INVENTOR:
Carroll H. Richards
by MacLeod, Calver, Copeland + Dike
Attys.

Fig. 7

May 5, 1936. C. H. RICHARDS 2,039,451
POWER TRANSMISSION MECHANISM
Filed March 11, 1933 6 Sheets-Sheet 5

INVENTOR:
Carroll H. Richards
by Macleod, Calver, Copeland & Dike
Attys.

Fig. 12.

Patented May 5, 1936

2,039,451

UNITED STATES PATENT OFFICE 2,039,451

POWER TRANSMISSION MECHANISM

Carroll H. Richards, Stow, Mass.

Application March 11, 1933, Serial No. 660,399

4 Claims. (Cl. 74—337)

This invention relates to mechanism for connecting two members to transmit the force or power supplied to or generated by one to the other and has one object the provision of a simple and practical mechanism for this purpose.

Other objects of the invention will be understood from the following description in conjunction with the accompanying drawings; in which.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The mechanism shown in Figs. 1 to 5 inclusive is illustrative of some of the important features of the invention. This mechanism comprises a driving element A, a driven element B and torque balancing mechanism M which constitutes the driving connection between said elements. The driving element A is keyed or otherwise secured to a power shaft 10 and is provided with an axial bore 11. The bore 11 extends only partially through the element A, being defined by an end wall 12 and side walls 13 which, as shown, shape said element into the form of a hollow cylinder open at one end. The driven element B is similarly shaped, being provided with an axial bore 14 defined by an end wall 15 and side walls 16. The side walls 16 are provided with a series of rectangular axially extending slots 17. Each slot is defined at one side thereof by a surface $r$, preferably, radially disposed relative to the element B, the surfaces $r$ of the several slots forming corresponding sides thereof. The exterior diameter of the element B is somewhat less than the diameter of the bore 11 of the element A. The element B is rotatably mounted on the power shaft 10 with its open end extending into the bore 11 of the element A, and its opposite end interengaged with a propeller shaft 9.

Figure 1:
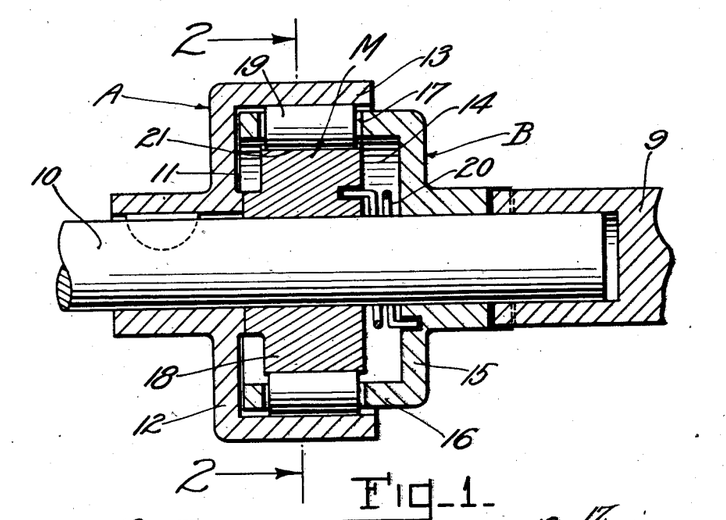
Fig. 1 is a sectional view of a mechanism illustrative of some of the important features of the invention.
Figure 2:
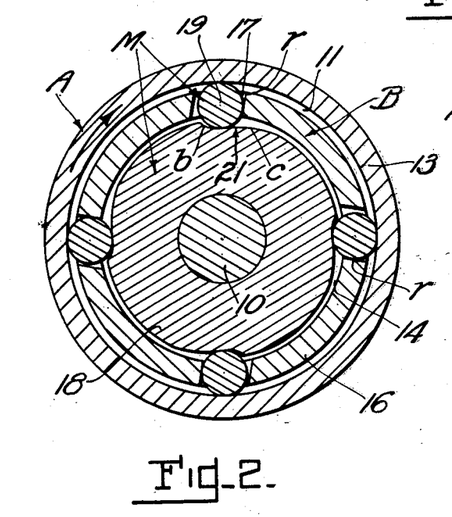
Figs. 2 and 3 are sectional views taken on the line 2—2 of Fig. 1 and showing the parts in different relative positions assumed during operation of the mechanism.
Figure 3:
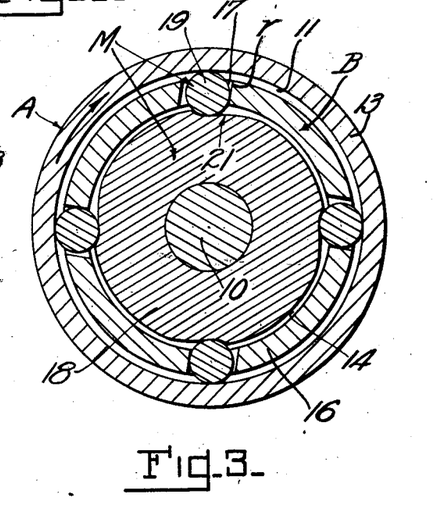

The torque balancing mechanism M comprises a balancing member 18, a series of rollers 19 adapted to releasably connect the balancer with the driving element A and a spring 20 surrounding the shaft 10 with one end engaging the element B and the other end engaging the member 18 and tending to hold said parts in driving relation as shown in Fig. 2. The balancer 18 is loosely mounted on the power shaft 10 within the bore 14 of the driven element B. It is provided with a series of axially extending recesses 21, receiving the rolls 19 which extend through the slots 17. Each recess 21 comprises an inoperative portion $b$ and an operative portion $c$. The inoperative portion $b$, preferably, conforms to the shape of the rollers and extends inwardly from the side edge of the recess to determine the maximum depth of the latter, at which point it joins the portion $c$ which extends therefrom in a reverse arc to the other edge of said recess. The design of this latter portion of the recess has an important bearing on the operation of the mechanism and will be hereinafter more fully described.

When the driving element A is rotated in the direction indicated by the arrows in Figs. 2 to 5 inclusive, it tends to move the rolls 19 into engagement with the surfaces $r$ of the slots 17 in the driven element B and also to move the rolls along the operative portions $c$ of the recesses 21 to wedge the rolls between the member 18 and driving element A and thereby provide a driving connection between the member 18 and elements A and B. This driving connection is effected or disrupted depending upon the relative magnitude of the opposed forces exerted upon the member 18 responsive to the driving torque of the driving element A and responsive to the resisting torque of the driven element B. This driving connection is effective when the former force exceeds the latter and is disrupted when the latter force exceeds the former by a predetermined amount controlled by the character of the operative portion c of the recesses 21.

The resisting force of the driven element B necessary to break the driving connection is determined by the angle formed by the lines of action of the forces exerted between the driving element A and the roller 19, and between the roller 19 and the balancer 18. These lines are common tangents, one of which, indicated at d (Fig. 4) is tangent to the roller 19 and inner surface of the wall 13 of the driving element A at their point of engagement while the other of which, indicated at e, is tangent to the operative portion c of the recess 21 and the roller 19 at their point of engagement, which angle is indicated at $\phi$ in Fig. 4.

Figures 4, 5, 6:
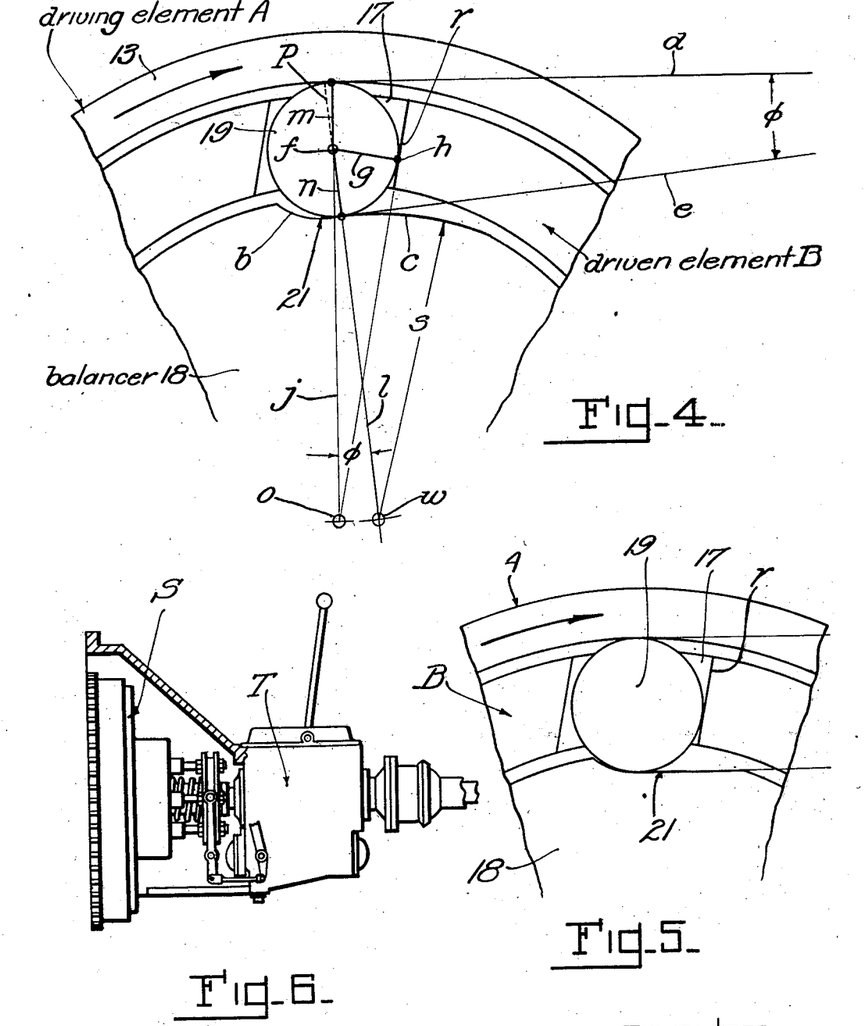
Figs. 4 and 5 are diagrams illustrating the operating principle of the invention.
Fig. 6 is a diagrammatic view of a mechanism embodying the invention.

Referring to the diagram of Fig. 4 the action of the roller 19 will be similar to that of a lever, the arms m and n of which are perpendicular to the lines d and e respectively, f representing the fulcrum. Since the surface r of the driven element that is engaged by the roller 19 is radial with respect to the center of rotation o, the line of action of the resisting force of the driven element B at the point of engagement of these parts must be perpendicular to said surface r. This line of force is indicated at g and is tangent to a circle the radius of which extends from the center of rotation o to said point of engagement. Since the radial surface r is tangent to the roller 19 at the point h, the line of force g must pass through the center of said roller which is the fulcrum f of the lever m n. This proves, therefore, that the lever arms m and n are equal for all positions of the roller relative to the other parts of the mechanism. Since the lever arms m and n are equal, the force applied to fulcrum f tending to drive the balancer 18 in a direction opposed to that of the drive must be equal to the force of the drive which may be represented by a value K.

The pressure P exerted by the driving force K on the balancer 18 may be found by reference to the triangle having two of its sides formed by the force lines d and e and the third side, representing the pressure P, formed by the lever arm n and its extension (shown in dotted lines) to meet the side d. With the side d of the triangle representing the driving force K, we have $$P = \frac{K}{\sin \phi}$$

The resisting force necessary to disrupt the drive may then be found as follows:

Let $a$=coefficient of friction, then any force greater than $Pa$=force necessary to cause slippage on surface c but since $$P = \frac{K}{\sin \phi}$$

any force greater than $$\frac{Ka}{\sin \phi} =$$

force necessary to cause slippage on surface c.

Since the pressure between the walls 13 of the driving element A and the roller 19 is equal to the pressure between said roller and the surface c of the balancer 18, then the total force necessary to disrupt the drive must be greater than any force equal to $$\frac{2Ka}{\sin \phi}.$$

For example, to find the angle $\phi$ when $K$ = 100 lbs.
$a$ = 0.03 and it is required to disrupt the driving connections when the resisting force has reached a magnitude of any force greater than 110 lbs.

$$\frac{2Ka}{\sin \phi} =$$

a force such that any force greater will cause disruption, or $$\frac{2 \times 100 \times 0.03}{\sin \phi} = 110$$

$\sin \phi = 0.05454$
and $\phi = 3°—7'$

It will thus be apparent that the common tangent to the surface c and the roller 19 must be substantially at an angle of 3°—7' to the line of action of the driving force at the point of engagement of said roller with the driving element A, to cause disruption of the driving connections under the above conditions if any greater force is applied.

To provide for the taking up of wear on the roller 19, the surface c is designed with a definite relation to the balancer 18 to keep the angle $\phi$ constant regardless of the operative position of the roller relative to said surface. For this purpose a radial line j is drawn from the center of rotation o through the point of engagement of the roller 19 with the driving element A. A line l is then drawn from the center f of the roller through the point of tangency of the roller with the surface c, which makes an angle equal to $\phi$ for the reason that the lines j and l bear a similar relation to the lines d and e, respectively. Then with a radius equal to the distance from the center of rotation o to the point of engagement of the roller with the balancer, and said point of engagement as a center, an arc is struck intersecting line l at w. With the point w as a center and the same radius indicated at s, an arc extending from the point of tangency of the line e with the roller 19 to the periphery of the balancer 18 is then drawn. This arc forms the surface of the portion c of the recess 21 and keeps the angle $\phi$ constant for any operative position of the roller thereon.

From the foregoing discussion of the design it should be apparent that any relation between the driving and resisting forces for breaking the driving connections can be had by changing the angle $\phi$, the operative portion c of the recess 21 being designed in accordance with said angle as above described.

If the angle $\phi$ is equal to zero as shown in the diagram of Fig. 4, we have $\frac{2 Ka}{\sin 0°}$ for the resisting force necessary to disrupt the driving connections. Since the sine of a zero angle equals o, $\frac{2 Ka}{o}$ equals infinity which shows that mechanism can be built to drive continuously without disruption.

Figure 7:
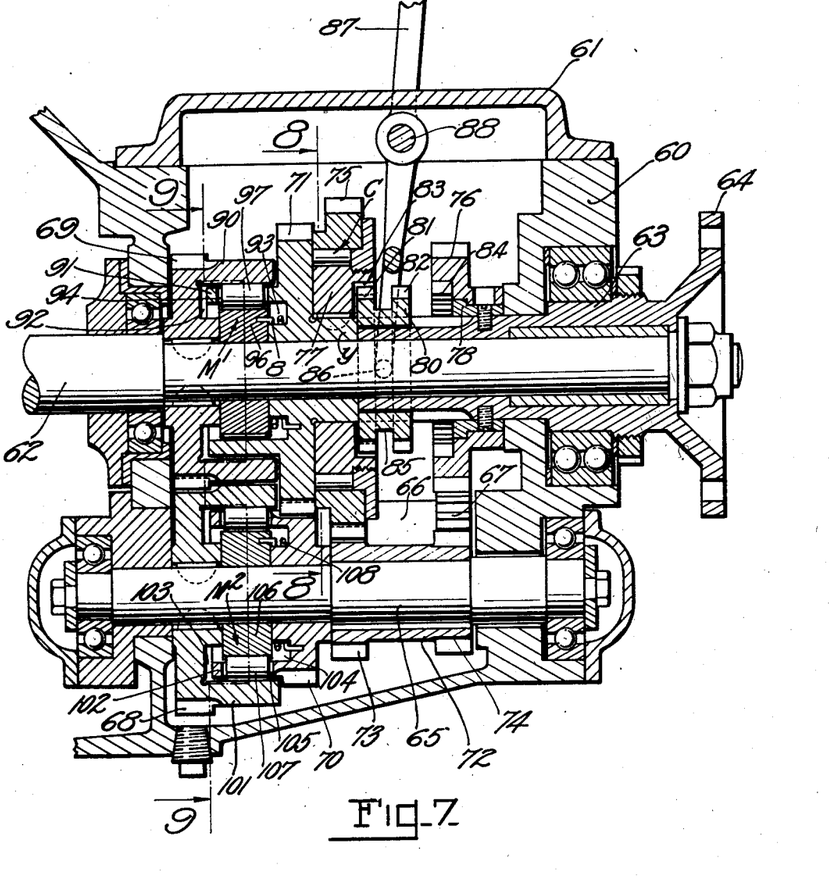
Fig. 7 is a longitudinal sectional view of the portion T of the mechanism shown in Fig. 6; of the invention.
Figures 8, 9, 10:
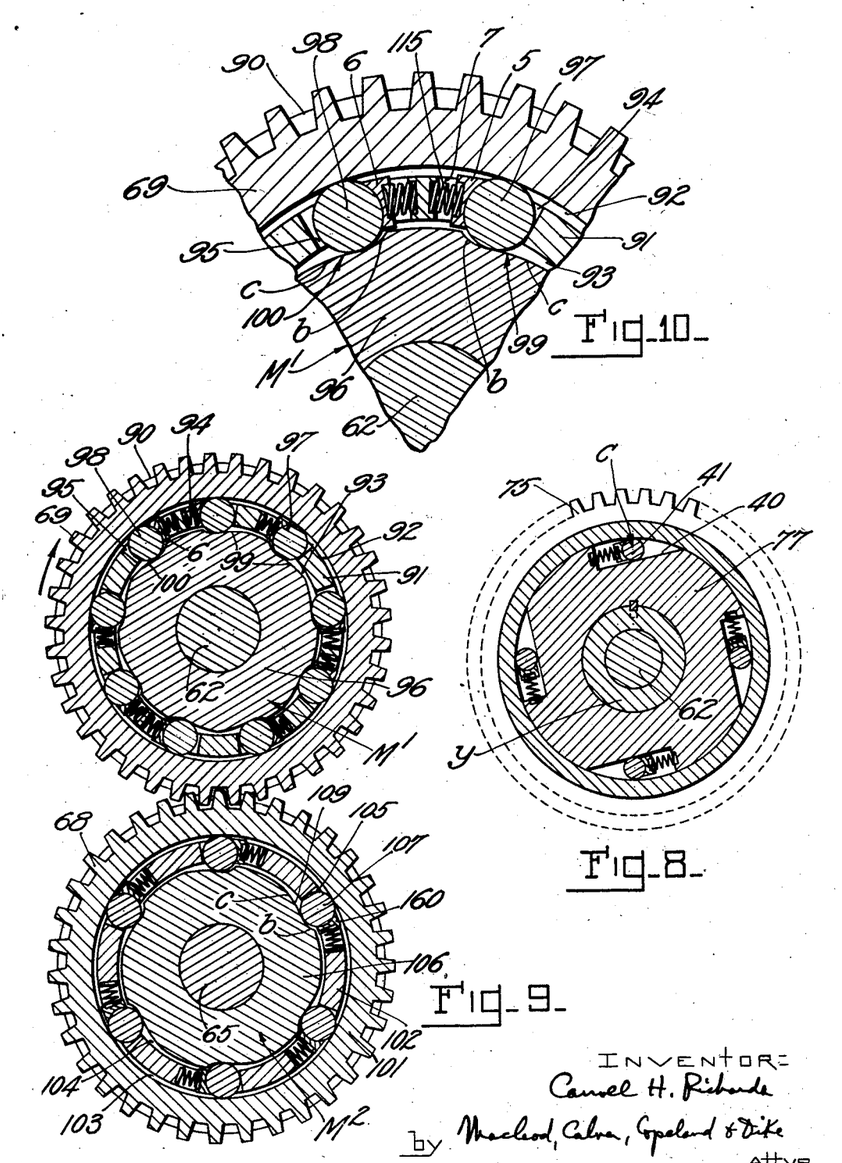
Figs. 8 and 9 are sectional views taken on the lines 8—8 and 9—9 respectively of Fig. 7.
Fig. 10 is an enlarged view of a portion of the mechanism illustrated in Fig. 7.

An automobile transmission of the 3-speed type embodying the invention is illustrated in Figs. 7 to 9 inclusive and is indicated at T in Fig. 6. At 60 is shown the transmission casing which is provided with a cover 61, and which is of a size and shape to enclose the mechanism and to provide the necessary supports and bearings for the various parts thereof. A driving shaft 62 is journalled at one end in a bearing in the front wall of the casing and at the other end in a bearing in a sleeve 63 formed as an integral part of the driven element 64 which is itself journalled in bearings in the rear end of said casing and is adapted to be connected to a propeller shaft (not shown). Disposed below the driving shaft and parallel thereto is a countershaft 65 which is journalled in bearings in the front and rear walls of the casing 68. In addition to the shafts above referred to, a third shaft 66 is disposed with its axis likewise parallel to that of the driving shaft but at one side thereof. This shaft rotatably supports the necessary reversing pinion 67 for producing the reverse drive.

As in the standard 3-speed transmission, the countershaft 65 is driven from the driving shaft 62 through a gear 68 secured to said countershaft in constant mesh with a gear 69 fast on the driving shaft. The countershaft 65 is also provided with a gear 70 rotatably mounted thereon and in constant mesh with a gear 71 rotatably mounted on the driving shaft 62. The countershaft is further provided with a sleeve 72 keyed thereto and having formed integral therewith or otherwise secured thereto gears 73 and 74. Gears 75 and 76, rotatable about the axis of the power shaft, are in constant driving relation with gears 73 and 74, respectively, the gear 73 meshing with the gear 75 and the reversing pinion 67 being interposed between the gears 74 and 76. The gear 75 constitutes one element of an overrunning clutch C, the other element 77 of which is keyed to the hub y of the gear 71 previously referred to. The overrunning clutch C is of usual construction with a plurality of inclined recesses 40 in which spring pressed rolls 41 are positioned adapted to connect the elements 75 and 77 in driving relation and disconnect the same. The gear 76 is rotatively mounted on a sleeve 78 secured to the sleeve 63 of the driven element 64.

Slidably mounted on the sleeve 63 but secured thereto for rotation therewith is a sleeve 80 which is provided with clutch elements 81 and 82 adapted to cooperate with clutch elements 83 and 84 respectively, the clutch element 83 being associated with the element 77 of the overrunning clutch C, while the clutch element 84 is associated with the gear 76. The sleeve 80 is provided with an annular groove 85 which is engaged by the forked end 86 of a lever 87 pivoted to the cover at 88. The sleeve 80 is adapted to be moved by the lever 87 to connect the clutch element 77 or the gear 76 with the driven element 64 for rotation therewith.

The gears 69 and 71 are adapted to be connected in driving relation and disconnected by a balancing mechanism M' similar to the balancing mechanism M described in connection with Figs. 1 to 5 inclusive for connecting and disconnecting the driving element A in driving relation with the driven element B. For this purpose, the gears 69 and 71 are provided on adjacent faces with projecting cylindrical portions 90 and 91 respectively, the portion 91 of the gear 71 being loosely received within an axial bore 92 in the cylindrical portion 90 of the gear 69. A balancing member 96 is rotatably mounted upon the driving shaft 62 within an axial bore 93 in the gear 71. A coil spring 8 surrounds the shaft 62 and is connected at one end to the gear 71 and at its other end to the member 96. The member 96 is provided with a series of spaced axially extending recesses 99 adapted to receive rolls 97. The recesses 99 are each provided with an inoperative portion b and an operative portion c. The shape of the operative portions c is determined as described in connection with Figs. 1 to 5 inclusive for determining the shape of the operative portions c of the recesses 21 of the balancing member 18. In the construction shown in Figs. 7 and 9, six recesses 99 are provided in the member 96, it being understood that more or less can be employed depending upon the load to be carried. The cylindrical portion 91 of the gear 71 is provided with a plurality of slots 94 through which the rolls 97 extend so that they may be brought into operative engagement with the inner surface of the cylindrical portion 90 of the gear 69. The cylindrical portions 90 and 91, the rolls 97 and the member 96 correspond, respectively, to the driving element A, driven element B, rolls 19 and balancing member 18 of the structure illustrated in Figs. 1 to 5 inclusive.

In the mechanism illustrated in Figs. 7 and 9 peripherally extending recesses 7 are provided in the cylindrical portion 91 communicating with the slots 94 for housing a spring 115 which is adapted to urge a shoe 5 into engagement with one of the rolls 97. The spring 115 acts to prevent spinning of the rolls 97 and assists the spring 8 tending to urge the member 96 into driving relation with the cylindrical portions 90 and 91 of the gears 69 and 71 respectively.

The rolls 97 operating in conjunction with the operative portion of the recesses 99 connect the member 96 in driving relation with the gears 69 and 71 when the gear 69 is rotated in the direction of the arrow in Fig. 9 and disconnects the same depending upon the ratio of the torque of the driving and driven members.

Means is also provided for effecting a driving connection between the balancing member 96 and the gears 69 and 71 when the gear 71 is rotating in the direction of the arrow in Fig. 9 but is acting as the driving element. For this purpose, the member 96 is provided with a plurality of recesses 100, there being three such recesses in the construction illustrated. Each of the recesses 100 is provided with an inoperative portion b and an operative portion c, the relationship of the operative to the inoperative portions of the recesses 100 being reversed with respect to the relationship of the operative and inoperative portions of the recesses 99. The reason for this will be clearly understood by those skilled in the art. A roll 98 is operatively positioned in each of the recesses 100 and projects through a lot 95 in the cylindrical portion 91 of the gear 71, there being a spring pressed shoe 6 engaging each of the rolls 98.

The gears 68 and 70 are adapted to be connected in driving relation and disconnected by a balancing mechanism M² similar to the balancing mechanism M for connecting the driving element A and driven element B of the structure shown in Figs. 1 to 5 inclusive. For this purpose, the gears 68 and 70 are provided on adjacent faces with projecting cylindrical portions 101 and 102 respectively, the portion 102 of the gear 70 being loosely received within an axial bore 103 in the portion 101 of the gear 68. A balancing member 106 is rotatably mounted upon the countershaft 65 within the axial bore 104 in the portion 102 of the gear 70. The balancing member 106 is provided with a plurality of axially extending recesses 109 each having an operative portion b and an inoperative portion c. Each of the recesses 109 is adapted to receive a roll 107 which extends through a slot 105 in the cylindrical portion 102 of the gear 70. Each of the rolls 107 is engaged by a spring pressed shoe 160 tending to prevent spinning of the rolls. A coil spring 108 surrounds the countershaft 65 and is connected at one end to the gear 70 and at its other end to the member 106.

In the operation of the mechanism illustrated in Figs. 7 to 9 inclusive, it will be understood that the lever 87 will be actuated to move the sleeve 80 to the left, as viewed in Fig. 7, to engage members 81 and 83, when it is desired to connect the driven element 64 to move in the same direction as the driving shaft 62, and the lever 87 is moved in the opposite direction to engage the member 82 and 84 when it is desired to drive the driven element 64 in the opposite direction. The high speed driving connection between the driving shaft 62 and the driven element 64 is effected through the gear 69, balancing member 96, gear 71, clutch element 77 and sleeve 80 which is splined to the sleeve 63 forming part of the driven element 64. When the driving shaft 62 and driven element 64 are thus connected in driving relation, the gear 68 and countershaft 65 will be rotated at the same speed as the drive shaft 62 and gear 69 while the gear 71, which is rotating with the gear 69, will be driving the gear 70 at a greater speed than the speed of gear 68. Consequently, the gear 70 will be overrunning the gear 68. Also, the gear 73, which is keyed upon the countershaft 65, will be driving the gear 75 to cause the latter to rotate at a slower speed than the gear 71 and the clutch element 77 and, consequently, the clutch element 77 will be overrunning the gear 75.

When the driving shaft 62 is driving the driven element 64 at an intermediate speed ratio, the driving connection therebetween will be effected through the gears 69, 68, balancer 106, gear 70, gear 71 and clutch element 77 which is operatively connected through the sleeve 80 to the sleeve 63 which forms part of the driven element 64. At this time the gears 69, 68 and 70 will be rotating together and will be driving the gear 71 at a slower speed. Consequently, the gear 69 will overrun the gear 71. Also, inasmuch as the gear 73 is driving the gear 75 at a slower speed than the gear 71 is being driven, the gear 71 and the clutch element 77 will overrun the gear 75.

When the driving shaft 62 is driving the driven element 64 at a low speed ratio, the driving connection therebetween is effected through gears 69 and 68, countershaft 65, gears 73 and 75 and clutch element 77 and thence through sleeve 80 and sleeve 63. At this time the gear 71, which is being driven at the same speed as the clutch element 77 inasmuch as it is keyed thereto, will be driven at a slower speed than the gear 69, and consequently, the gear 69 will be overrunning the gear 71. Furthermore, the gear 71 will be driving the gear 70 at a slower speed than the gear 68 and, consequently, the gear 68 will be overrunning the gear 70.

It will be apparent, in view of the foregoing explanation, that the gears 69 and 71 exert opposed forces upon the balancing member 96, the force exerted by the gear 69 being responsive to the driving torque of the driving shaft 62, while the force exerted by the gear 71 is responsive to the resisting torque of the driven element 64.

The operative portion c of the recesses 99 of the balancing member 96 are so constructed as to permit a driving connection between the gears 69 and 71 and the balancing member 96 when the force exerted by the gear 71 upon the balancing member 96 is not more than a predetermined amount greater than the force exerted upon the balancer 96 by the gear 69. The driving connection between the gears 69 and 71 is disconnected when the resultant force of the two opposed forces upon the balancer 96 exceeds the above mentioned predetermined amount. The driving connection between the gears 68 and 70 then becomes effective to drive the driven element 64 at an intermediate speed ratio.

The operative portions c of the recesses 109 of the balancing member 106 are so constructed as to effect a driving connection between the gears 68 and 70 when the force exerted by the gear 70 upon the balancer 106 is less than a predetermined amount greater than the force exerted by the gear 68 upon the balancer 106. When the force exerted by the gear 70 upon the balancer 106 increases to a point such that it is a predetermined amount greater than the force exerted by the gear 68 upon the balancer 106, the driving connection between the gears 68 and 70 is disconnected. The driving connection between the driving shaft 62 and driven element 64 is now effected through the gear 73 to drive the driven element 64 at a low speed ratio.

In the construction illustrated, the force exerted upon the balancing member 106 by the gear 68 is the same as that exerted by the gear 69 upon the balancing member 96 inasmuch at the pitch diameters of the gears 68 and 69 are the same and the radii of the cylindrical portions 90 and 101 are the same. Likewise, the radii of the cylindrical portions 91 and 102 are the same but because of the difference in the pitch diameters of the gears 70 and 71, the force exerted upon the balancing member 106 by the gear 70 is greater than the force exerted upon the balancing member 96 by the gear 71. Consequently, the operative portions c of the recesses 109 are constructed so that the force exerted by the gear 70 upon the balancing member 106 may be considerably greater than the force exerted by the gear 71 upon the balancing member 96 before the driving connection between the gears 68 and 70 is disconnected. It will be understood, therefore, that the resultant of the opposed forces exerted upon the balancing member 96 by the gears 69 and 71 is less than the resultant of the opposed forces exerted upon the balancing member 106 by the gears 68 and 70.

It will be understood that the recesses 100 of the balancer 96 are so designed as to effect a driving connection between the gears 69 and 71 when the driven element 64 is acting as the driving element, that is, when it is desired to utilize the braking power of the engine which normally supplies the power for driving the driving shaft 62.

Another mechanism embodying the invention is illustrated in Figs. 11 to 15 inclusive and indicated at S in Fig. 6. This mechanism comprises a driving shaft 62' and a driven shaft 64'. A member 69' is suitably keyed upon the driving shaft 62' and a member 71' is suitably keyed upon the driven shaft 64'. The members 69' and 71' are provided on adjacent faces with projecting cylindrical portions 90' and 91', respectively, the portion 91' being loosely received within an axial bore 92' in the cylindrical portion 90'. A balancing member 96' is rotatably mounted upon the driving shaft 62' within an axial bore 93' in the member 71'. The member 96' is provided with a series of spaced axially extending recesses 99' adapted to receive rolls 97'. The recesses 99' are each provided with an inoperative portion b and an operative portion c. The shape of the operative portions c is determined as described in connection with Figs. 1 to 5 inclusive for determining the shape of the operative portions c of the recesses 21 of the balancing member 18. The cylindrical portion 91' is provided with a plurality of slots 94', through which the rolls 97' extend so that they may be brought into operative engagement with the inner surface of the cylindrical portion 90'. Peripherally extending recesses 7' are provided in the cylindrical portion 91' communicating with the slots 94' for housing a spring 115' which is adapted to urge a shoe 5' into engagement with one of the rolls 97'.

Figures 11, 13, 14, 15:
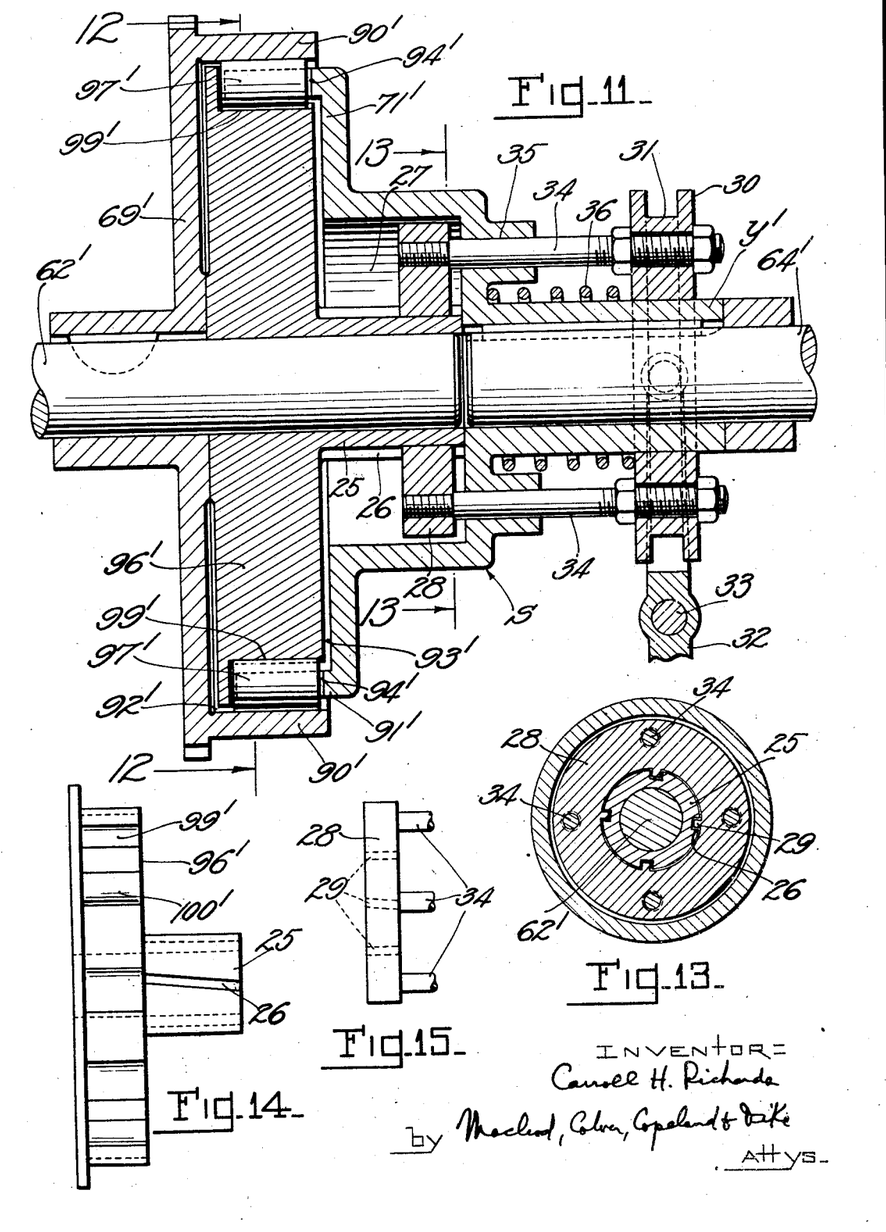
Fig. 11 is a longitudinal sectional view of the portion S of the mechanism shown in Fig. 6; embodying the invention.
Figs. 12 and 13 are sections taken on lines 12—12 and 13—13 respectively of Fig. 11.
Figs. 14 and 15 are detail views of parts of the construction shown in Fig. 11.
Figure 12:
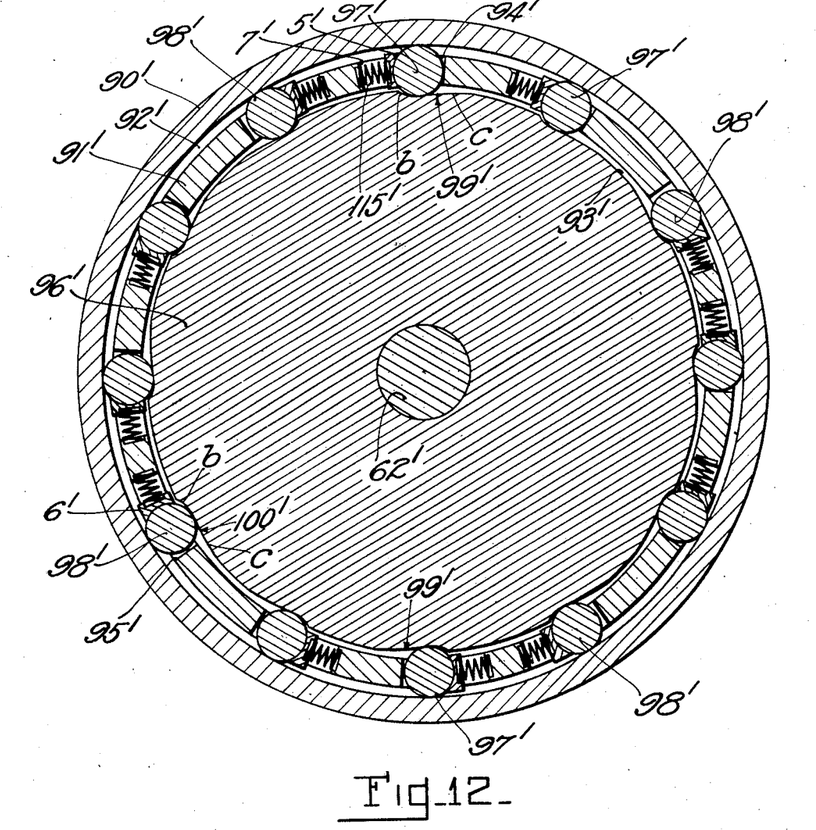

The member 96' also is provided with a plurality of recesses 100', each of which is provided with an inoperative portion b and an operative portion c. The relationship of the operative to the inoperative portions of the recesses 100' is reversed with respect to the relationship of the operative and inoperative portions of the recesses 99'. A roll 98' is operatively positioned in each of the recesses 100' and projects through a slot 95' in the cylindrical portion 91', there being a spring pressed shoe 6' engaging each of the rolls 98'.

To this extent the mechanism illustrated in Figs. 11 to 15 inclusive is similar to the balancing mechanism M' of the structure illustrated in Figs. 7 to 9 inclusive, the cylindrical portions 90' and 91', the rolls 97' and 98' and the member 96' with the recesses 99' and 100' corresponding respectively to the cylindrical portions 90 and 91, the rolls 97 and 98, and the member 96 with the recesses 99 and 100 of the balancing mechanism M' illustrated in Figs. 7 to 9 inclusive. Thus, this portion of the mechanism provides means for providing a driving connection between the shafts 62' and 64' when either the shaft 62' or 64' acts as the driving element.

In addition the member 96' is provided with a hub portion 25 having a plurality of spiral grooves 26. The member 71' is provided with an axial bore 27 adapted to receive for axial movement therein a disc 28 surrounding the hub 26 and having a plurality of ribs 29 adapted to engage the grooves 26. A disc 30 surrounds and is loosely mounted upon the hub y' of the member 71' and is provided on its outer periphery with an annular groove 31 adapted to receive one end of a lever 32 pivotally mounted upon a stud 33. A plurality of rods 34 extend through and are slidably mounted in openings 35 in the member 71' and each is connected at its opposite ends to the discs 28 and 30. The discs 28 and 30 normally are urged to the right, as viewed in Fig. 11, by a spring 36 surrounding the hub with one end engaging the member 71' and its other end engaging the disc 30.

Thus, it will be apparent in view of the foregoing description that a driving connection is afforded between the shafts 62' and 64' and the balancing member 96' regardless of whether the shaft 62' or the shaft 64' is acting as the driving element. If it is desired to release the driving connections between the shafts 62' and 64' and the balancing member 96', the lever 32 is actuated about its pivot 33 to move the discs 28 and 30 axially toward the left, as viewed in Fig. 11, thereby causing the balancing member 96' to be rotated as a result thereof relative to the driving shaft 62', thus disrupting the driving connection between the shafts 62' and 64' and the balancing member 96'. The mechanism illustrated in Figs. 11 to 15 inclusive is a clutch mechanism embodying the basic principles underlying the present invention and illustrates another of the various mechanisms which may embody the invention.

I claim:

1. The combination of a driving element, a driven element, a rotatable member, means actuated in response to the torque ratio of said driving and driven elements for effecting a driving connection between said elements and for disconnecting said driving connection, means providing operative connections between said driving element and said member, means actuated in response to the torque ratio of said driving and driven elements for effecting a driving connection between said member and said driven element and for disconnecting said connection, and additional means for effecting a driving connection between said member and said driven element.

2. The combination of a rotatable driving shaft, a rotatable driven element, a countershaft, intermeshing gears fixed on said shafts, intermeshing gears rotatably mounted on said shafts, means for operatively connecting the gear rotatably mounted on said driving shaft with said driven element, means actuated in response to the torque ratio of said driving shaft and driven element for providing a driving connection between the gears fixed and rotatably mounted on said driving shaft and for disconnecting said driving connection, and means actuated in response to the torque ratio of said driving shaft and driven element for providing a driving connection between the gears fixed and rotatably mounted on said countershaft and for disconnecting said driving connection, another pair of intermeshing gears one of which is fixed on said countershaft, and means providing a one-way driving connection between the other gear of said pair and the gear rotatably mounted on said driving shaft.

3. The combination of a rotatable driving shaft, a rotatable driven element, a countershaft, intermeshing gears fixed on said shafts, a gear rotatably mounted on said driving shaft, means for operatively connecting the gear rotatably mounted on said driving shaft with said driven element, means actuated in response to the torque ratio of said driving shaft and driven element for providing a driving connection between the gears fixed and rotatably mounted on said driving shaft and for disconnecting said driving connection, another pair of intermeshing gears, one of which is fixed on said countershaft, and means providing a one-way driving connection between the other gear of said pair and the gear rotatably mounted on said driving shaft.

4. The combination of a driving element, a driven element, a rotatable member, means actuated in response to the torque ratio of said driving and driven elements for effecting a driving connection between said elements and for disconnecting said driving connection, means providing operative connections between said driving element and said member, and means for effecting a driving connection between said member and said driven element.

CARROLL H. RICHARDS.